UNITED STATES PATENT OFFICE.

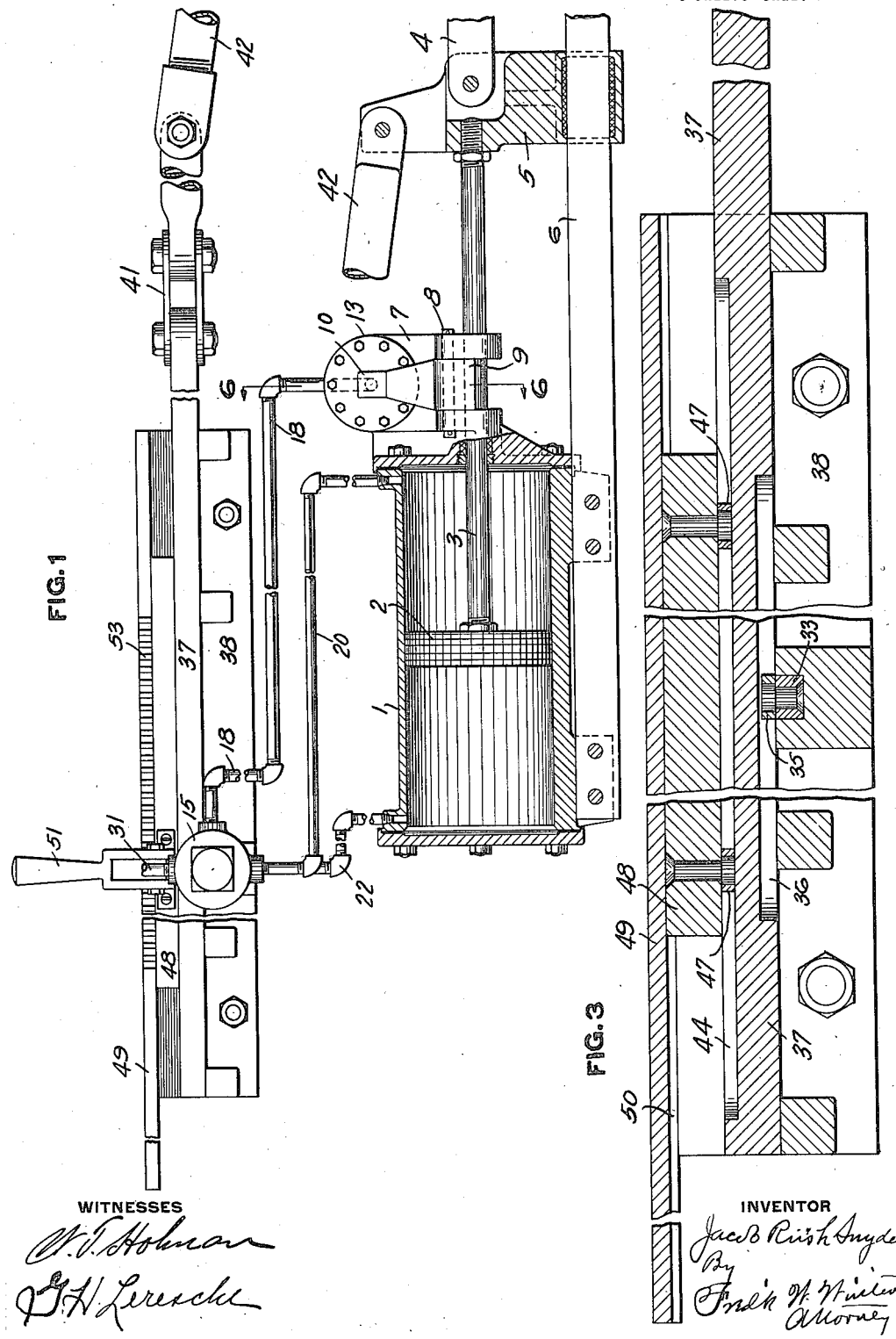

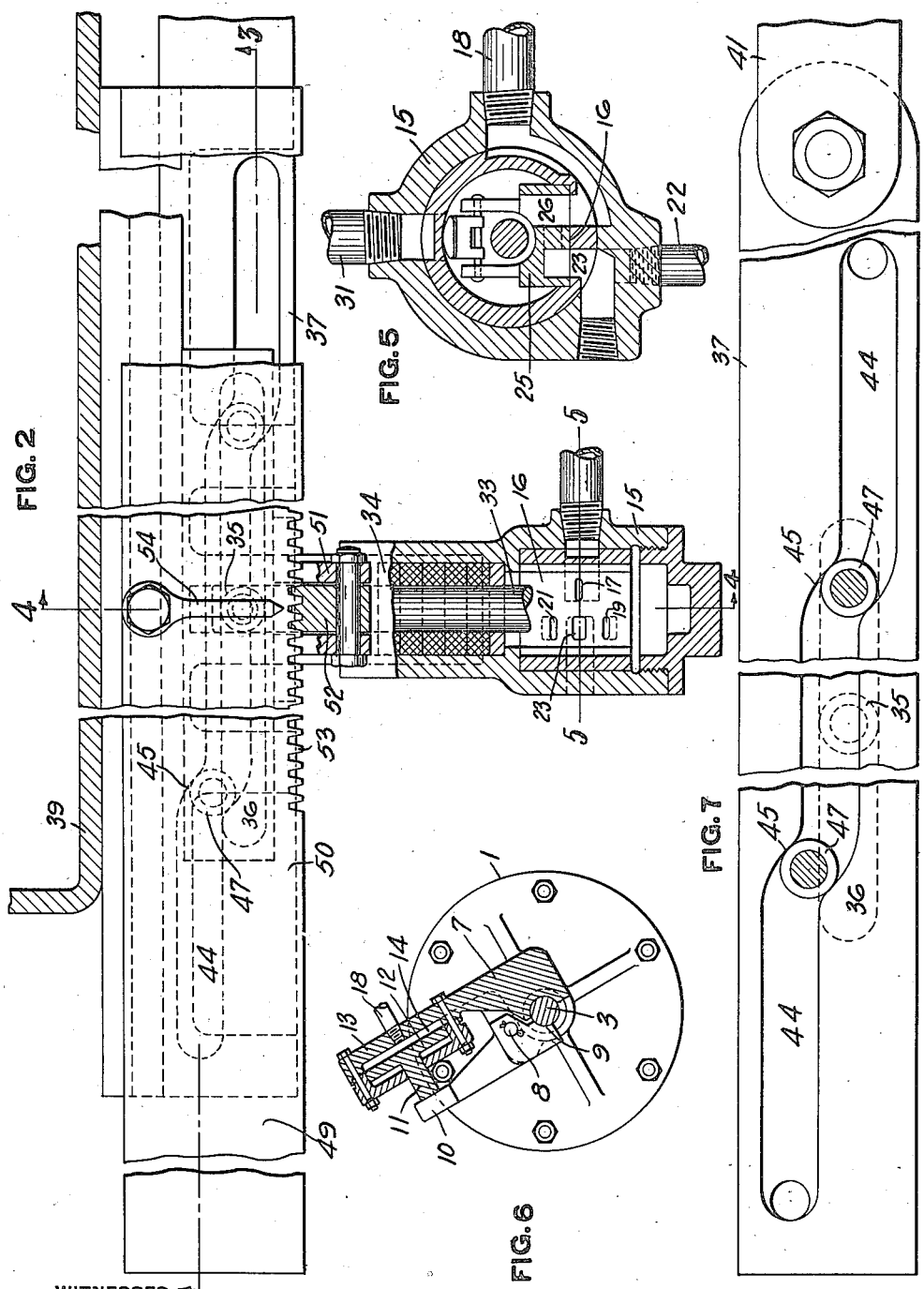

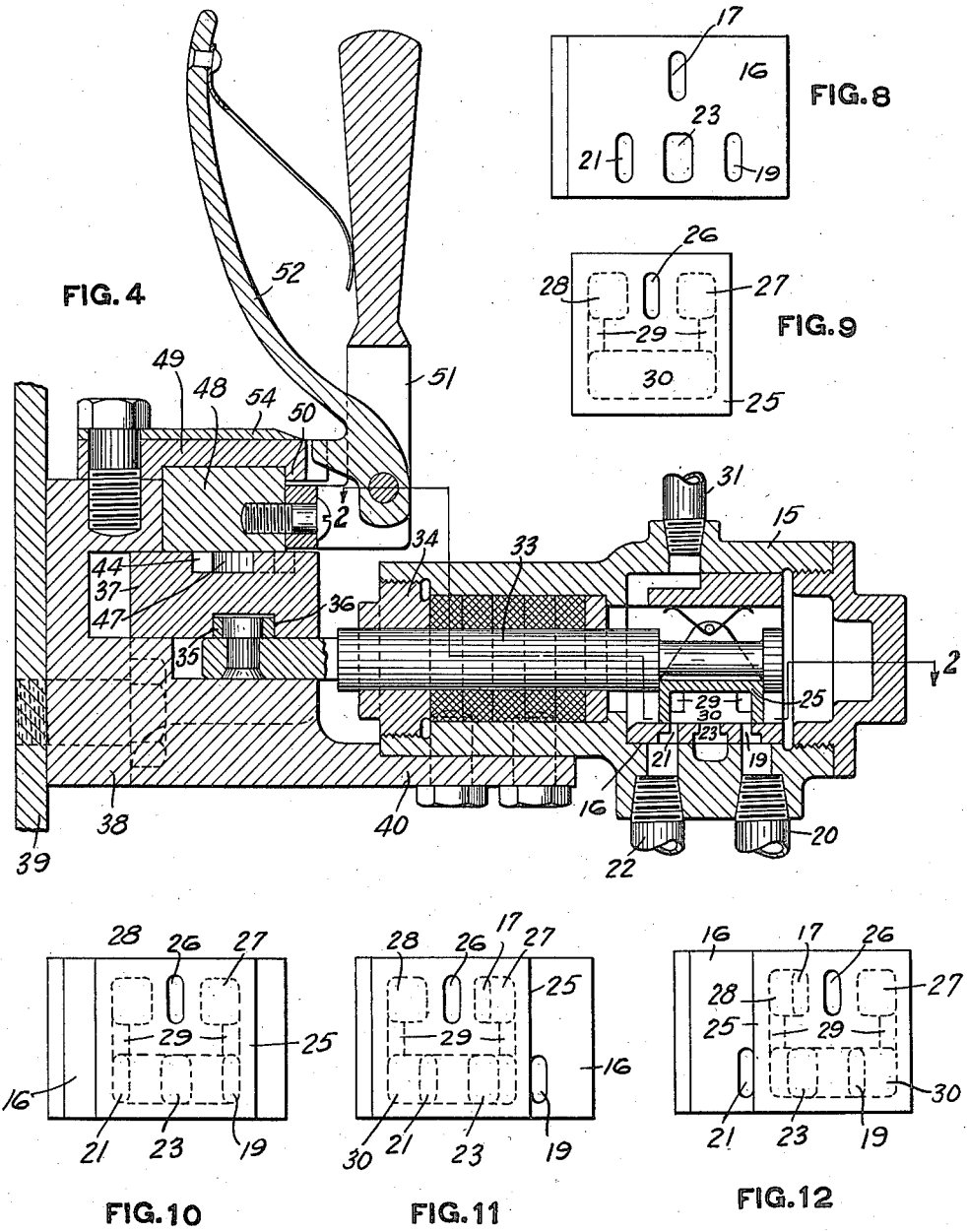

JACOB RUSH SNYDER, OF PITTSBURGH, PENNSYLVANIA, ASSIGNOR TO PERCY E. DONNER, OF PITTSBURGH, PENNSYLVANIA.

VALVE REVERSING GEAR.

1,295,934.  Specification of Letters Patent.  Patented Mar. 4, 1919.

Application filed April 29, 1916. Serial No. 94,372.

*To all whom it may concern:*

Be it known that I, JACOB RUSH SNYDER, a resident of Pittsburgh, in the county of Allegheny and State of Pennsylvania, have invented a new and useful Improvement in Valve Reversing Gear, of which the following is a specification.

This invention relates to mechanism for operating the reversing gear of steam engines, such as locomotives. The object of the invention is to provide fluid actuated mechanism for moving the usual valve gear and which is so arranged as to insure positive movement of the valve gear in both directions, which will prevent the valve gear from being moved farther than intended, and which provides means for positively holding the reversing gear against accidental movement due to jolting of the locomotive; and which objects are secured by simple and inexpensive mechanism, and which does not require a perfect packing for the reversing cylinder piston or stuffing box.

These objects are secured by means of the mechanism hereinafter described and claimed.

In the accompanying drawing, Figure 1 is a side elevation of the mechanism, partly broken out, the reversing cylinder being shown in longitudinal section; Fig. 2 is a plan view of the reversing mechanism, the controlling valve being shown in horizontal section on the line 2—2, Fig. 4; Fig. 3 is a vertical section on the line 3—3, Fig. 2; Fig. 4 is a transverse section on the line 4—4, Fig. 2; Fig. 5 is a section on the line 5—5, Fig. 2; Fig. 6 is a section on the line 6—6, Fig. 1; Fig. 7 is a plan view of one of the sliding members; Fig. 8 is a plan view of the valve seat; Fig. 9 is a plan view of the slide valve; and Figs. 10, 11 and 12 are diagrammatic views showing respectively the normal and the two operative positions of said valve.

In the drawings, 1 represents a reversing cylinder in which works the piston 2 whose piston rod 3 is connected to the usual reversing or reach rod 4 which in turn is connected to the usual link mechanism of the engine, not illustrated. In the construction illustrated the piston rod 3 and reversing rod 4 are both connected to a member 5 which slides on and is guided by the guide bar 6, but this obviously is an immaterial detail. In neutral position the piston 2 stands midway of the length of the cylinder 1, and when it is moved in one direction the link mechanism is moved to drive the engine forwardly while when the piston is moved in the opposite direction the link mechanism is moved to drive the engine backwardly. These movements of the piston are secured by admitting and exhausting fluid pressure alternately to and from the opposite ends of the cylinder. The valve mechanism is so arranged that in normal condition there is no fluid pressure in either end of the cylinder, but during this time the reversing rod is positively locked against movement, but upon movement of the valve actuating mechanism the rod locking device is released and fluid pressure admitted to one or the other end of said cylinder to move the piston rod. As a consequence no tight packings for the piston or stuffing box is necessary and furthermore accidental movement of the gear due to the jolting of the locomotive is prevented.

The rod locking device is shown as cast integral with one head of the cylinder, and comprises a stationary member 7 having pivotally connected thereto at 8 the gripping jaw 9 which is provided with an arm or extension 10 arranged to be actuated by a projection 11 on a movable abutment 12 in the form of a piston or diaphragm in the small cylinder 13 which is arranged to have motive fluid supplied to one face of said movable abutment, as in the chamber 14, in order to drive the projection 11 against the arm 10 and cause the jaw 8 to grip the piston or reversing rod.

The valve mechanism for supplying fluid pressure alternately to the opposite ends of the reversing cylinder 1 and locking cylinder 13 comprises a valve casing 15 having a seat 16 provided with four ports, to wit, a port 17 connected by pipe 18 to the locking cylinder 13, a port 19 connected by pipe 20 to one end of the reversing cylinder 1, a port 21 connected by pipe 22 to the opposite end of the reversing cylinder, and an exhaust port 23. Coöperating with said seat is a slide valve 25 provided on one side with a port 26 extending entirely therethrough, and on the same side with cavities 27 and 28 connected by cross grooves or channels 29 to a long longitudinal cavity 30 on its opposite side. The fluid pressure supply is through a pipe 31 to the chamber above said slide valve. When the slide valve is in normal or central position the connections are as shown in Fig. 10, in which port 26 through the slide valve registers with port 17 in the valve seat and which is connected to the locking cylinder 13, while cavity 30 connects both ports 19 and 21 to the exhaust port 23. Consequently in this position the locking device is maintained in locking condition and both ends of the reversing cylinder are at atmospheric pressure. When the valve is moved toward the left, viewing Fig. 4, the condition is as shown in Fig. 11, in which the slide valve has uncovered port 19, thus admitting fluid pressure to the forward end of the reversing cylinder, while cavity 27 registers with the locking cylinder port 17, thus exhausting the locking cylinder to the atmosphere through said cavity 27, cross channel 26 and cavity 30, and maintaining the rear end of cylinder at atmospheric pressure. When the slide valve is moved toward the right, viewing Fig. 4, the condition is shown as in Fig. 12, in which the port 21 is uncovered, thus admitting fluid pressure to the rear end of reversing cylinder 1, while ports 17 and 19 are both connected to the exhaust through cavities 28 and 30 and cross channel 29. In both positions shown in Figs. 11 and 12, the locking cylinder and one end of the reversing cylinder are at atmospheric pressure, and fluid pressure is admitted to the opposite end of the reversing cylinder.

The slide valve 25 has connected thereto the actuating rod or stem 33, extending through a stuffing box 34 in the valve casing and carrying at its outer end an antifriction roller 35 which projects into a longitudinal slot 36 in the lower face of a bar 37 which is movably mounted, both longitudinally and laterally, in a bracket 38 secured to the boiler or cab wall 39, and which bracket also has a projection 40 to which the valve casing 15 is secured. The bar 37 is connected through the links 41 and rod 42, with the reversing rod 4, or more specifically, to the slider 5. The bar 37 on its upper face is provided with a cam groove 44 of the form shown in Fig. 7, the same having two curved or hump portions 45, with straight portions at both sides of said curves and intermediate the same. Engaging the cam groove 44 are two antifriction rollers 47 which are carried by a sliding member 48 so mounted in the bracket 39 as to have longitudinal but no transverse movement therein, this movement being secured by means of the cover plate 49 secured to the bracket and lying above the member 48 and provided with a downwardly projecting flange or lip 50 hanging over the outer edge of the member 48. Secured to the sliding member 48 is a handle 51, by means of which said member 48 can be slid backward and forward to different positions. The handle 51 is provided with a suitable locking latch 52 arranged to engage teeth or notches 53 in the edge of the cover plate 49. A pointer 54 on cover 49 is preferably provided to indicate the central or neutral position.

The operation of the valve mechanism is as follows: When the handle 51 is in central or neutral position the valve 25 is also in neutral position, that is, in the position shown in Fig. 4 and making the connections shown in Fig. 10, in which position both ends of the reversing cylinder are at atmospheric pressure, while the rod locking device is in locking condition. The position of the rollers 47 in the cam groove 44 in neutral position is indicated in Fig. 7. When it is desired to drive the engine forwardly the handle 51 is grasped and moved, say, to the right, viewing Figs. 1, 2 and 7, thus carrying with it the sliding member 48. When the handle has been moved to the desired extent the lock 51 will lock the same and the sliding member 48 positively in position. This movement of the sliding member 48 causes the cam rollers 45 carried thereby to be moved toward the right, viewing Fig. 7, and on account of the curves in slot 44, the bar 37 is pushed backwardly, viewing Fig. 4, and since the slot 36 on the lower surface of bar 37 is straight, this pulls the valve stem 33 rearwardly or toward the left, viewing Fig. 4, and moves the slide valve 25 toward the left, viewing Fig. 4, to the position shown in Fig. 11, in which position the locking cylinder 13 and rear end of the reversing cylinder 1 are connected to the exhaust, while port 19 is uncovered. Consequently the rod locking device is released and fluid pressure is admitted to the forward end of the reversing cylinder, thereby moving the reversing rod and the valve gear so as to shift the engine slide valve to drive the engine forwardly. Before this movement begins, however, the handle 51 is locked in position, so that no jar of any kind can be transmitted from the valve reversing rod to the engineer's hand. As the reversing rod moves outwardly, the bar 37 is moved toward the right, viewing Fig. 7, and since the rollers 47 are now stationary, this movement of the cam slot 44 toward the right, brings the curved portions of said slot against said rollers, thereby causing the bar 37 to move forwardly, or toward the right, viewing Fig. 4, thus moving the slide valve 25 toward the right until it is again brought to normal or neutral position, as shown in Fig. 10. Consequently, as soon as the valve gear has moved to the desired position the valve 25 is automatically shifted to neutral position, in which both ends of the reversing cylinder are connected to the atmosphere, and fluid pressure is admitted to the locking cylinder to positively hold the reversing rod against further movement.

When it is desired to reverse the engine, the handle 51 is moved in the opposite direction above described, to wit, to the left, viewing Figs. 1, 2 and 7, whereupon the reverse movements from those above described occur,—that is to say, the valve 25 is moved to the position shown in Fig. 12, in which the locking cylinder is exhausted as before, but the port 21 instead of port 19 is uncovered, thus admitting fluid pressure in this case to the rear end of the reversing cylinder and moving the piston and reversing rod in the opposite direction. The movement of the reversing rod here also moves the bar 37 lengthwise, but in the reverse direction from that above described, and as soon as the reversing rod has moved to the desired extent, valve 25 is again shifted to normal position.

It will be understood that the member 48 has a sliding movement, but no lateral movement, while the bar 37 has a lateral movement during the time that the handle 51 is moved, due to the camming engagement between itself and the sliding member 48, and it also has a longitudinal movement during the time that the reversing rod is moved in either direction, due to its mechanical connection to the reversing rod.

The valve 25 is of very simple construction, and its actuating mechanism is also simple and so arranged that in order to drive the engine either forwardly or backwardly the engineer need only push handle 51 in whichever direction he wishes the engine to move, thus simplifying the operation and preventing possibility of driving the engine in the wrong direction. The valve mechanism, reversing cylinder and lock are so arranged that in normal condition both ends of the reversing cylinder are open to the atmosphere while the lock is at all times in locking condition, said lock being only momentarily released during the time that fluid pressure is admitted to one or the other end of the reversing cylinder to move the reversing rod. Consequently there is no necessity of having the packing of the reversing cylinder piston and stuffing box very tight, and no danger of the reversing gear getting out of said position due either to leakage from the reversing cylinder or to the jolting of the engine.

Various arrangements of a sliding member and camming connection between the same and the control valve may be made without departing from the spirit of the invention.

What I claim is:—

1. In valve reversing mechanism, the combination of a fluid pressure motor, a reversing rod operated thereby, valve mechanism for controlling the supply and exhaust of motive fluid to and from the motor, a bar connected to the valve mechanism and slidable longitudinally and laterally, a manually operable longitudinally slidable member having camming connections with the sliding bar so that as said member is moved longitudinally the bar is moved laterally to actuate the valve to admit motive fluid to the motor, and means connecting the reversing rod and the slidable bar for causing said bar to move with the reversing rod whereby the valve mechanism is actuated to exhaust motive fluid from the motor when the reversing rod has moved to the required extent.

2. In valve reversing mechanism, the combination of a fluid pressure motor, a reversing rod operated thereby, a fluid pressure locking means for said rod, a valve mechanism for controlling the supply and exhaust of motive fluid to and from said motor and said locking means, a manually movable member, camming connections between the same and said valve mechanism arranged so that when said member is moved the valve is actuated to exhaust motive fluid from the locking means and admit fluid to one side of the motor, and a second movable member arranged to travel with the reversing rod and coöperating with the camming connections to cause the valve mechanism to be moved to exhaust motive fluid from the motor and admit motive fluid to the locking device when the reversing rod has traveled to the desired extent.

3. In valve reversing mechanism, the combination of a fluid pressure motor, a reversing rod operated thereby, a fluid pressure locking means for locking said rod in its different positions, a valve mechanism for controlling the supply and exhaust of motive fluid to and from opposite sides of the motor and to and from the locking means, a manually operable slidable member, camming connections between the same and said valve mechanism arranged so that when said member is moved the valve is actuated to exhaust motive fluid from the locking means and admit fluid to one side of the motor, and a second slidable member movable with the reversing rod and coöperating with the camming connections to cause the valve mechanism to be moved to exhaust motive fluid from the motor and admit motive fluid to the locking means when the reversing rod has traveled the desired distance.

4. In valve reversing mechanism, the combination of a fluid pressure motor, a reversing rod operated thereby, a fluid pressure locking means for said rod, a valve mechanism for controlling the supply and exhaust of motive fluid to and from opposite sides of said motor and to and from said locking means, a manually movable member, and camming connections including a slidable bar between the movable member and the valve mechanism and arranged so that when the member is moved the valve is actuated to exhaust motive fluid from the locking means and admit motive fluid to one end of the motor, said slidable bar being arranged to travel with the reversing rod so that when said rod has traveled to the desired extent the valve mechanism is actuated through the camming connections to exhaust motive fluid from the motor and admit motive fluid to the locking means.

5. In valve reversing mechanism, the combination of a fluid pressure cylinder, a piston therein, a reversing rod operated by said piston, fluid pressure locking means for locking said rod in different positions, valve mechanism for controlling the supply and exhaust of motive fluid to and from the two ends of said cylinder and to and from said locking means, two members slidably mounted to move in parallel lines, one of said members being arranged to be manually movable and the other being arranged to move with the reversing rod, and camming connections between said members and said valve mechanism so that when one of said members is moved manually the valve is moved to exhaust fluid pressure from the locking means and admit pressure to one end of the cylinder and when the other of said members is moved by the reversing rod moving to the desired extent the valve mechanism is moved to exhaust fluid pressure from both ends of the reversing cylinder and admit pressure to the locking means.

6. In valve reversing mechanism, the combination of a fluid pressure motor, a reversing rod operated thereby, fluid pressure locking means for said rod, valve mechanism for controlling the supply and exhaust of motive fluid to and from said motor and said locking means, a bar connected to the valve mechanism and slidable longitudinally and laterally, a manually operable longitudinal slidable member having camming connections with the sliding bar so that as said member is moved longitudinally the bar is moved laterally to actuate the valve mechanism to exhaust motive fluid from the locking means and admit fluid to one side of the motor, and means connecting the reversing rod and the slidable bar for causing said bar to move with the reversing rod, whereby the valve mechanism is actuated to exhaust motive fluid from the motor and admit motive fluid to the locking device when the reversing rod has moved to the required extent.

7. In valve reversing mechanism, the combination of a reversing cylinder, a piston therein, a reversing rod connected to said piston, a locking device for said rod, valve mechanism for controlling the supply and exhaust of motive fluid to and from said locking device and arranged to admit fluid pressure to one end of the cylinder and simultaneously connect the locking device and the opposite end of said cylinder to atmosphere, and to exhaust fluid pressure from one end of the cylinder and simultaneously admit fluid pressure to the locking device, a manually movable member, camming connections between the same and the valve mechanism and arranged to move the valve mechanism to admit fluid pressure to one end of the cylinder and exhaust it from the locking device, a second member movable with the travel of the reversing rod and coöperating with the camming connections so that when the reversing rod has traveled the desired distance said valve is moved to exhaust fluid pressure from the cylinder and admit fluid pressure to the locking device.

8. In valve reversing mechanism, the combination of a reversing cylinder, a piston therein, a reversing rod connected to said piston, a locking device for said rod, valve mechanism for controlling the supply and exhaust of motive fluid to and from said locking device and arranged to admit fluid pressure to one end of the cylinder and simultaneously connect the locking device and the opposite end of said cylinder to atmosphere, and to exhaust fluid pressure from one end of the cylinder and simultaneously admit fluid pressure to the locking device, a manually operated slidable valve actuating member, camming connections between the same and the valve mechanism and arranged to move the latter to admit fluid pressure to one end of the reversing cylinder and exhaust the same from the locking device, a second sliding member movable with the travel of the reversing rod and coöperating with the camming connections whereby when the reversing rod has traveled the desired distance the valve is moved through the movement of said second sliding member to exhaust fluid pressure from the reversing cylinder and admit fluid pressure to the locking device.

9. In valve reversing mechanism, the combination of a reversing cylinder, a piston therein, a reversing rod connected to said piston, a locking device for said rod, valve mechanism for controlling the supply and exhaust of motive fluid to and from said locking device and arranged to admit fluid pressure to one end of the cylinder and simultaneously connect the locking device and the opposite end of said cylinder to atmosphere, and to exhaust fluid pressure from one end of the cylinder and simultaneously admit fluid pressure to the locking device, a pair of sliding members movable in parallel lines, one of said members being manually movable, camming connections between said members whereby the movement of the manually actuated sliding member moves the valve to admit fluid pressure to one end of the reversing cylinder and exhaust fluid pressure from the locking device, connections between the other sliding member and the reversing rod, said member coöperating with the camming connections so that upon the movement of said second sliding member the valve is moved to exhaust fluid pressure from the reversing cylinder and admit fluid pressure to the locking device.

10. A power reverse gear for locomotives including a reversing rod, a fluid pressure motor for operating said rod, valvular mechanism for controlling the motive fluid to and from the motor, a bar adapted to slide longitudinally and laterally and having camming connections with the valvular mechanism, a manually operable slidable member arranged to be moved to a position corresponding with the desired movement of the reverse gear and fixed in such position and in such movement to move the bar laterally to actuate the valve to admit motive fluid to the motor, and means connecting the reversing rod and the slidable bar so that said bar will move with the reversing rod whereby, when the reversing rod has moved the required extent, the bar is moved laterally by coöperation with the fixed manual means to thereby actuate the valvular mechanism to exhaust motive fluid from the motor.

11. A power reverse gear for locomotives including a reversing rod, a fluid pressure motor for operating said rod, a fluid pressure lock for locking the rod, valvular mechanism for controlling the motive fluid to and from the motor and the lock and arranged so that normally both sides of the motor are exhausted and the lock applied, a longitudinal and laterally slidable bar having camming connections with the valvular mechanism, a manually operable slidable member having camming connections with the bar arranged to be moved to a position corresponding with a desired movement of the reverse gear and fixed in such position and during said movement to move the bar laterally to thereby actuate the valvular mechanism to unlock the lock and admit motive fluid to the motor, and connections between the reversing rod and the bar for causing said bar to move in synchronism with the rod whereby as the rod reaches the limit of desired travel, the bar is moved laterally by coöperation with the fixed manually operable member to actuate the valvular mechanism to exhaust motive fluid to the motor and apply the lock.

In testimony whereof, I have hereunto set my hand.

JACOB RUSH SNYDER.

Witnesses:
GLENN H. LERESCHE,
A. E. JOHNSON.